(12) United States Patent  
Burke et al.

(10) Patent No.: US 10,842,296 B2
(45) Date of Patent: Nov. 24, 2020

(54) PRODUCT DISPLAY WITH BIASED STAND

(71) Applicant: WM. WRIGLEY JR. COMPANY, Chicago, IL (US)

(72) Inventors: Ray Burke, Chicago, IL (US); Mark Armstrong, London (GB); Narut Ruthiraphong, London (GB)

(73) Assignee: WM. WRIGLEY JR. COMPANY, Chicago, IL (US)

( * ) Notice: Subject to any disclaimer, the term of this patent is extended or adjusted under 35 U.S.C. 154(b) by 1 day.

(21) Appl. No.: 16/461,617

(22) PCT Filed: Nov. 17, 2017

(86) PCT No.: PCT/US2017/062175
§ 371 (c)(1),
(2) Date: May 16, 2019

(87) PCT Pub. No.: WO2018/094150
PCT Pub. Date: May 24, 2018

(65) Prior Publication Data
US 2020/0060442 A1 Feb. 27, 2020

Related U.S. Application Data

(60) Provisional application No. 62/424,992, filed on Nov. 21, 2016.

(51) Int. Cl.
A47F 5/11 (2006.01)
A47F 5/12 (2006.01)
B65D 25/20 (2006.01)
F16M 13/00 (2006.01)

(52) U.S. Cl.
CPC ............. *A47F 5/114* (2013.01); *A47F 5/12* (2013.01); *B65D 25/20* (2013.01); *F16M 13/005* (2013.01)

(58) Field of Classification Search
CPC .. A47F 5/11; A47F 5/112; A47F 5/114; A47F 5/12; A47F 5/16; B65D 5/50; B65D 5/52; B65D 5/5206; B65D 25/20; B65D 5/44; F16M 13/005; F16M 13/00
USPC ............. 206/45.24, 45.25, 45.27; 211/132.1, 211/133.1; 248/150
See application file for complete search history.

(56) References Cited

U.S. PATENT DOCUMENTS 3,664,494 A 5/1972 Mergens
3,836,104 A * 9/1974 Miller .................... A47F 5/114
248/150

(Continued)

FOREIGN PATENT DOCUMENTS

| CN | 2509949 Y | 9/2002 |
| EP | 2695822 B1 | 12/2015 |
| WO | 200504677 A1 | 1/2005 |

*Primary Examiner* — Bryon P Gehman

(57) ABSTRACT

Methods and apparatuses for displays are disclosed. The display includes a tray, a stand, and a biasing member. The tray comprises a plurality of walls configured to house a plurality of consumer products. The stand is coupled to the tray and comprises an interior wall disengaging an interior face of a stand edge in a first configuration in which the stand is collapsed and engaging the stand edge in a second configuration in which the stand is erect. The biasing member is coupled to the stand and biases the stand to move from the first configuration to the second configuration.

20 Claims, 6 Drawing Sheets

(56) References Cited

U.S. PATENT DOCUMENTS

| | | | | |
|---|---|---|---|---|
| 4,331,231 A | * | 5/1982 | Boyle | B65D 5/5206 |
| | | | | 206/45.25 |
| 4,384,651 A | * | 5/1983 | Smith | A47F 5/114 |
| | | | | 248/150 |
| 4,583,705 A | * | 4/1986 | Schmitt | A47F 5/114 |
| | | | | 211/132.1 |
| 4,726,476 A | * | 2/1988 | Smith | A47F 5/114 |
| | | | | 211/132.1 |
| 4,813,536 A | * | 3/1989 | Willis | B65D 5/5206 |
| | | | | 206/45.25 |
| 5,443,168 A | | 8/1995 | Dyment | |
| 5,868,367 A | | 2/1999 | Smith | |
| 6,098,820 A | | 8/2000 | Smith | |
| 6,234,433 B1 | * | 5/2001 | Maglione | A47F 5/112 |
| | | | | 248/152 |
| 6,918,491 B2 | * | 7/2005 | Moss | A47F 5/114 |
| | | | | 206/45.27 |
| 8,540,091 B2 | | 9/2013 | Kristensen | |
| 2017/0086604 A1 | * | 3/2017 | Goldsmith | A47F 5/116 |

* cited by examiner

PRODUCT DISPLAY WITH BIASED STAND

BACKGROUND

Displays are used in brick and mortar establishments to showcase consumer products in an attractive and convenient manner. Displays that are distributed in individual pieces requiring assembly at the brick and mortar establishment are generally known in the prior art. Time and know how on the part of the establishment are required in order to build and use these displays to present merchandise to consumers. In addition, the correct parts need to be provided along with assembly instructions, creating several opportunities for mismatched or incomplete displays and inefficiencies.

SUMMARY

One embodiment relates to a display. The display includes a tray, a stand, and a biasing member. The tray is configured to house a plurality of consumer products. The stand is coupled to the tray and comprises an interior wall disengaging an interior face of a stand edge in a first configuration in which the stand is collapsed and engaging the stand edge in a second configuration in which the stand is erect. The biasing member is coupled to the stand and biases the stand to move from the first configuration to the second configuration.

Another embodiment relates to a method of assembling a display. The method includes providing a tray configured to house a plurality of consumer products. The method further includes providing a stand comprising an interior wall disengaging an interior face of a stand edge in a first configuration in which the stand is collapsed and engaging the stand edge in a second configuration in which the stand is erect. The method includes coupling a biasing member to the stand, the biasing member biasing the stand to move from the first configuration to the second configuration. The method further includes coupling the tray to the stand.

DETAILED DESCRIPTION

Figure 1:
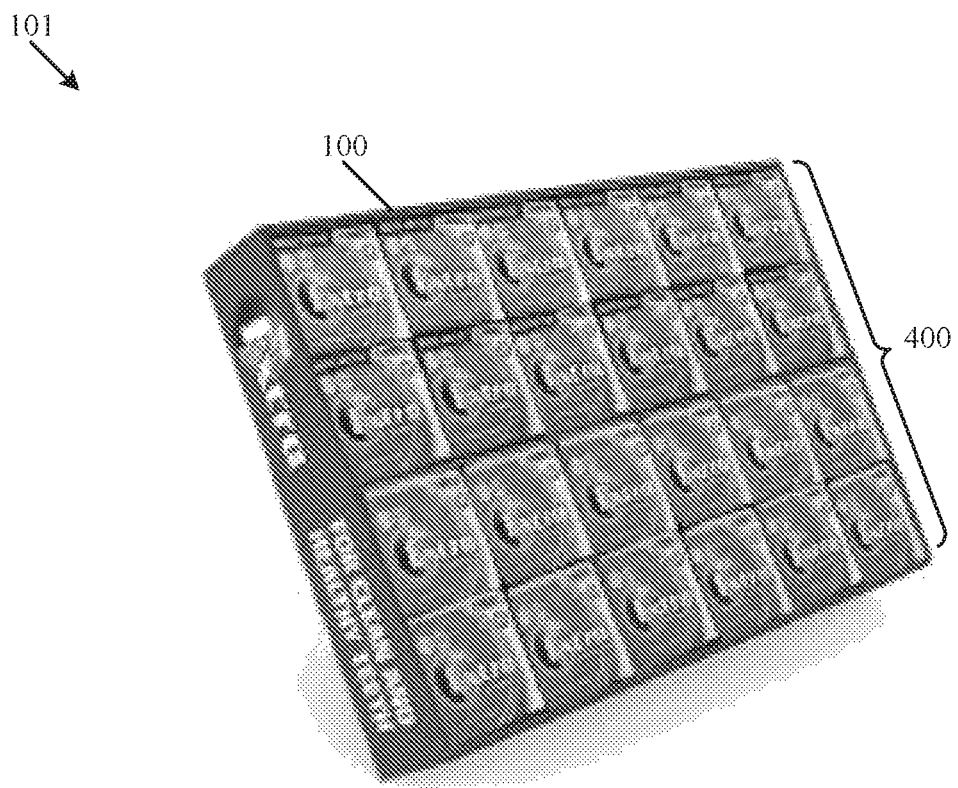
FIG. 1 is an illustrative representation of a display, according to an example embodiment.
Figure 2:
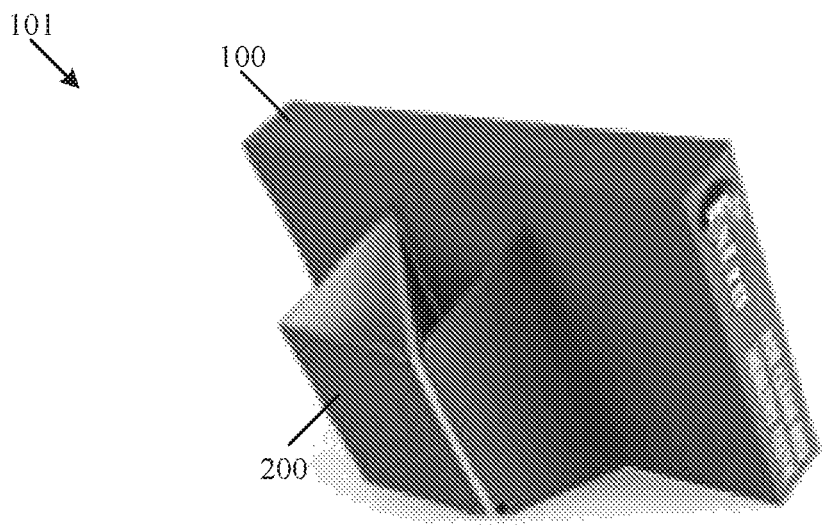
FIG. 2 is another illustrative representation of the display shown in FIG. 1.

The present disclosure provides self-erecting product displays that may be pre-assembled, packed, shipped, and easily deployed in any of various retailers, wholesalers, and other brick-and-mortar establishments. Referring to FIGS. 1 and 2, a product display 101 includes a tray 100, a stand 200, and a plurality of consumer products 400. Each component of the product display 101 may be composed of any of a variety of rigid materials including paperboard, plastic, metal, and so on. Such materials may further be laminated or coated, and may include corrugation. The consumer products 400 may include any of a variety of consumer goods or consumer packaged goods such as food products, office supplies, batteries, and so on. The consumer products 400 are arranged and presented to consumers in the tray 100, which is sized and shaped to accommodate the consumer products 400. The tray 100 is coupled to the stand 200. In some arrangements, the tray 100 is removably coupled to the stand 200, however in other arrangements, the tray 100 is permanently coupled to the stand 200 for example by an adhesive.

The stand 200 may be configured to set a display angle of the tray 100 relative to a surface upon which the stand 200 sits. In some arrangements, the display angle is 90 degrees such that the tray 100 is perpendicular to a surface upon which the stand 200 sits. In other arrangements, the display angle is less than 90 degrees such that the tray 100 is not perpendicular relative to the surface upon which the stand 200 sits.

Figure 3:
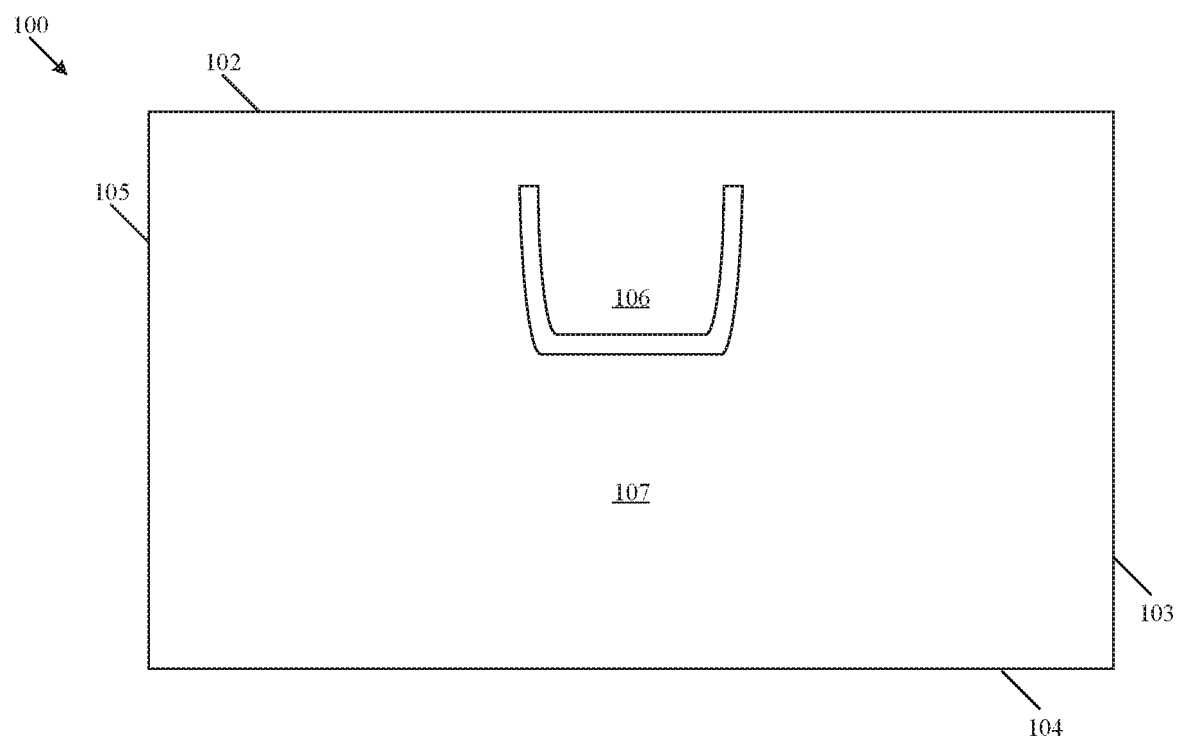
FIG. 3 is an example embodiment of a tray of the display shown in FIG. 1.

Referring now to FIG. 3, the tray 100 includes a tray back 107, a tray top wall 102, a first tray side wall 103, a tray bottom all 104, and a second tray side wall 105. Each of the tray walls 102, 103, 104, 105 may be formed as walls adjoining the tray back 107 and each other to define a receptacle in which the plurality of consumer products 400 may be contained. For example, in some arrangements, each of the walls 102, 103, 104, 105 are perpendicular to the tray back 107, and collectively form a square shaped or rectangular receptacle for consumer products 400. In some arrangements, the tray 100 is formed of a single blank and each of the tray walls 102, 103, 104, 105 are formed by bending corresponding edges of the blank to form each corresponding wall. In other arrangements, there is no defined receptacle (e.g., no walls or some but not all edges have a wall) and only a tray back 107, and consumer products 400 may be disposed on or coupled to the tray back 107 (e.g., via adhesives, hooks, pegs, stacks, etc.)

In some arrangements, the tray 100 further includes at least one tab 106. The tab 106 is configured to couple the tray 100 to the stand 200. In some such arrangements, the tab 106 is defined by a "U"-shaped cutout in the tray back 107. Other shapes and arrangements of the tab 106 are possible, and are configured to engage a corresponding feature of the stand 200. In some arrangements, the tray 100 includes more than one tab 106 and may correspondingly couple more than one stand 200 to the tray 100.

Figure 4:
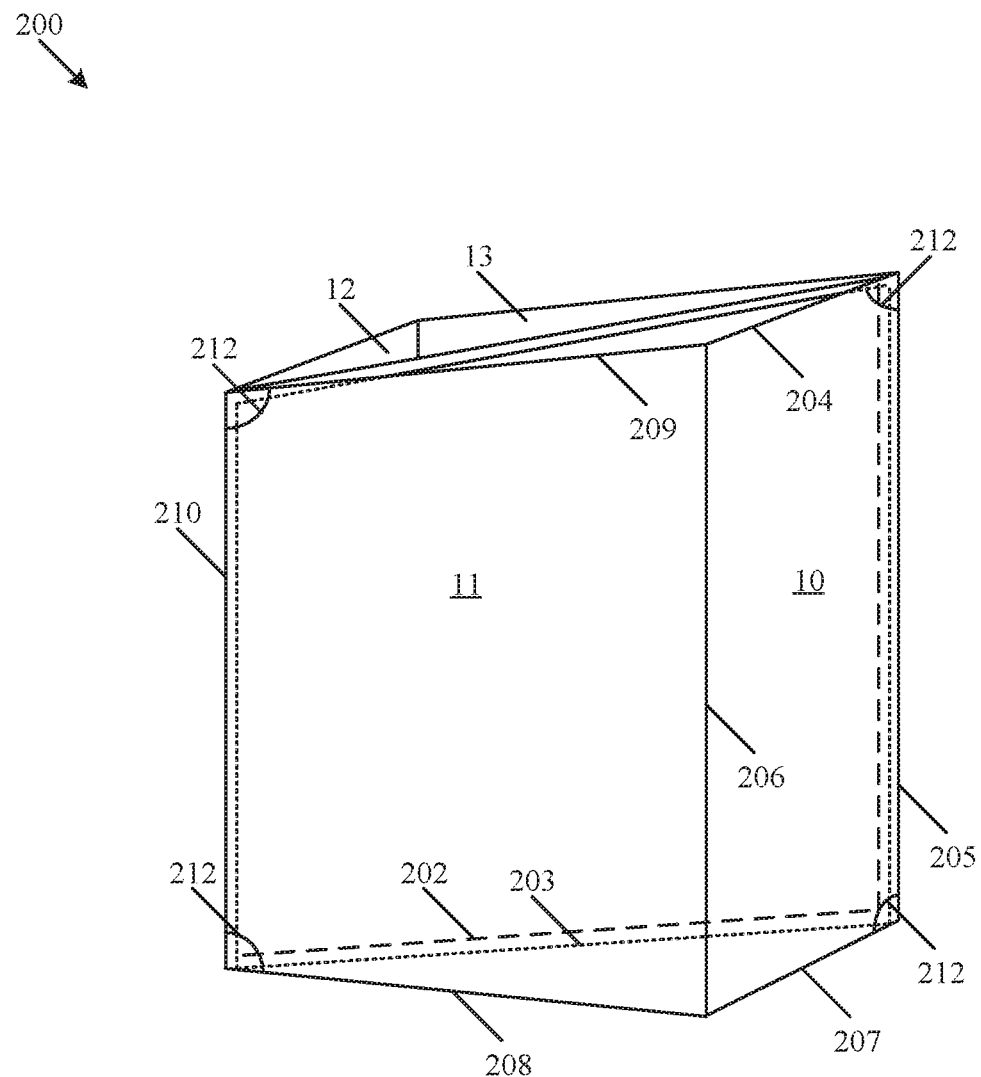
FIG. 4 is an example embodiment of an erect configuration of a stand of the display shown in FIG. 1.
Figure 5:
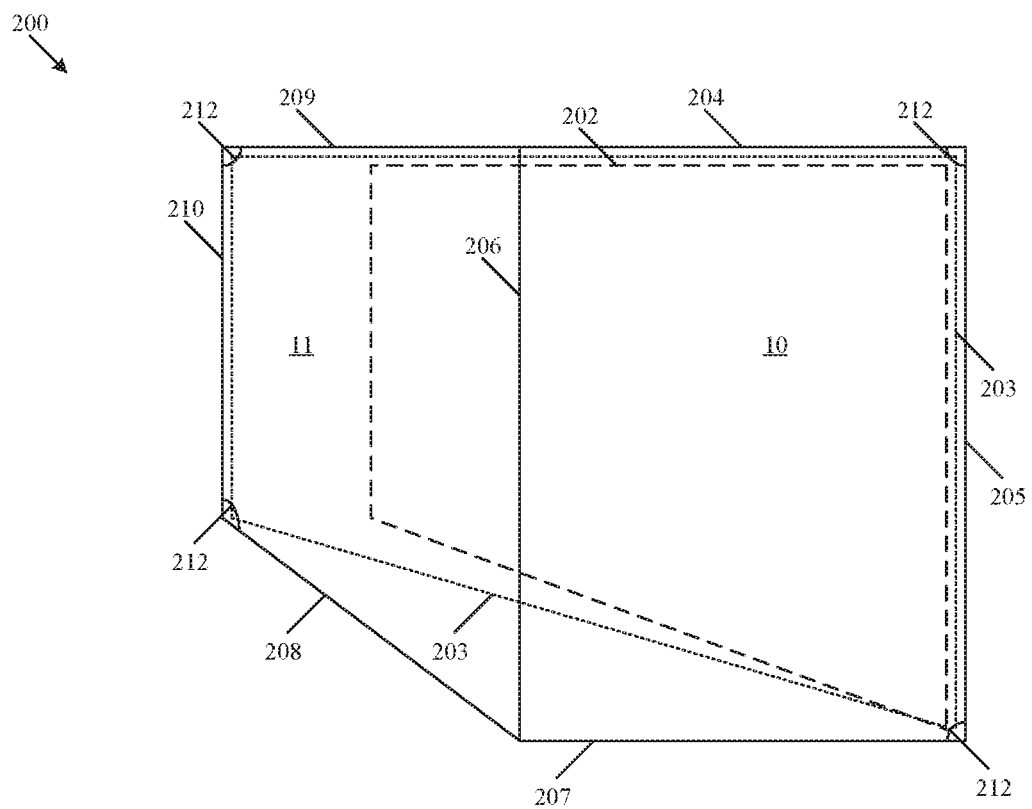
FIG. 5 is an example embodiment of a collapsed configuration of the stand shown in FIG. 4.

Referring to FIG. 4, the stand 200 is configured to be coupled to the tray 100 and to transition from a first configuration in which the stand 200 is collapsed (e.g., as shown in FIG. 5) to a second configuration in which the stand 200 is erected (e.g., as shown in FIG. 4). In some arrangements, the stand 200 is configured to reversibly transition to and from the first configuration and the second configuration, such that the stand may be collapsed for storage or transport and re-erected for use as needed. In addition, in some arrangements, more than one stand 200 may be coupled to the tray 100, for example multiple stands 200 may be used to support a wide or heavy tray 100.

In one arrangement, the stand 200 includes a front stand wall 10, a first side stand wall 11, a back stand wall 12, a second side stand wall 13, and an interior wall 202. In some arrangements, all of the walls 11, 12, 13, 14, 202 are collectively formed from one blank. The front stand wall 10 includes four sides defined by a top front edge 204, a first front side edge 205, a second front side edge 206, and a bottom front edge 207. The first side stand wall 11 is adjacent to the front stand wall 10 and shares the second front side edge 206 and further includes a side top edge 209, a side back edge 210, and a side bottom edge 208. Other arrangements may have additional walls and edges.

In some arrangements, the tray 100 is coupled to the stand 200 by engaging the tab 106 to the top front edge 204. In one such arrangement, the tray 100 is coupled to the stand 200 by sliding the tab 106 over the top front edge 204 and into the interior of the stand 200 while the rest of the tray back 107 slides down the front stand wall 10. As such, a portion of the top front edge 204 is sandwiched between the tab 106 and the tray back 107, and the tray back 107 is parallel and adjacent to the front stand wall 10 when the tray 100 is coupled to the stand 200.

In various arrangements, the display angle of the tray 100 may be determined by the configuration of at least one of the tray 100 and the stand 200. For example, in one arrangement where the stand 200 determines the display angle, the tray 100 is substantially flat and the display angle corresponds to the angle defined by the front stand wall 10 and the surface upon which the stand sits. In some such arrangements, the display angle corresponds to the angle defined by the second front side edge 206 and the side bottom edge 208. In other arrangements, the display angle may be defined by features disposed on the tray 100. For example, a shelf or panel may be disposed in the receptacle of the tray 100 at an angle relative to the tray back 107. As such, consumer products 400 may be presented at a display angle that differs from an angle defined by the stand 200. In yet other arrangements, features of both the tray 100 and the stand 200 determine the display angle.

The interior wall 202 is serves to limit a range of motion of the stand 200. As discussed above, the stand 200 can transition from a first, collapsed configuration (e.g., as shown in FIG. 5) to a second, erected configuration (e.g., as shown in FIG. 4). In some arrangements, the interior wall 202 is coupled to the first front side edge 205 and not the side back edge 210. In addition, in such arrangements, the interior wall 202 is sized to engage the interior face of the side back edge 210 in the second configuration and to be disengaged from the interior face of the side back edge 210 in the first configuration. As such, as the stand 200 transitions from the first configuration to the second configuration, the leading edge of the interior wall 202 will translate toward and engage the interior face of the side back edge 210 in the second configuration and prevent the stand 200 from transitioning further. In various alternative arrangements, the interior wall 202 may be embodied in any of several different forms instead of a wall panel as shown in FIGS. 4 and 5. For example, the interior wall 202 may be embodied as a partial wall panel, or one or more prongs, or may be composed of a different material than the rest of the stand 200, or so on, limiting the range of motion of the stand 200.

The stand 200 includes a biasing member 203. The biasing member 203 is formed of an elastic material with at least some shape memory characteristics. In various arrangements, the biasing member 203 may be made of rubber, spandex, stretch vinyl, nylon, and so on. In some arrangements, the biasing member 203 is formed as a continuous loop (e.g., as a rubber band) disposed about the stand 200, while in other arrangements, the biasing member 203 is formed as one or more lengths or sheets of an elastic material coupled to the stand 200 at either end.

In the arrangement shown in FIG. 4, the biasing member 203 is a loop disposed at the intersection of the top front edge 204 and the first front side edge 205, the intersection of the first front side edge 205 and the bottom front edge 207, the intersection of the side bottom edge 208 and the side back edge 210, and finally the intersection of the side back edge 210 and the side top edge 209. In some arrangements, notches 212 at each intersection are configured to retain the biasing member 203 in position. In addition, in some arrangements, the biasing member 203 is disposed on the same or substantially the same plane as the interior wall 202. In these particular arrangements, the size of the biasing member 203 corresponds to the collective distance between each intersection. As such, the biasing member 203 is a first, larger size in the first configuration in which the stand is collapsed (e.g., as shown in FIG. 5) and is biased toward a second, smaller size in the second configuration in which the stand is erect (e.g., as shown in FIG. 4).

Figure 6:
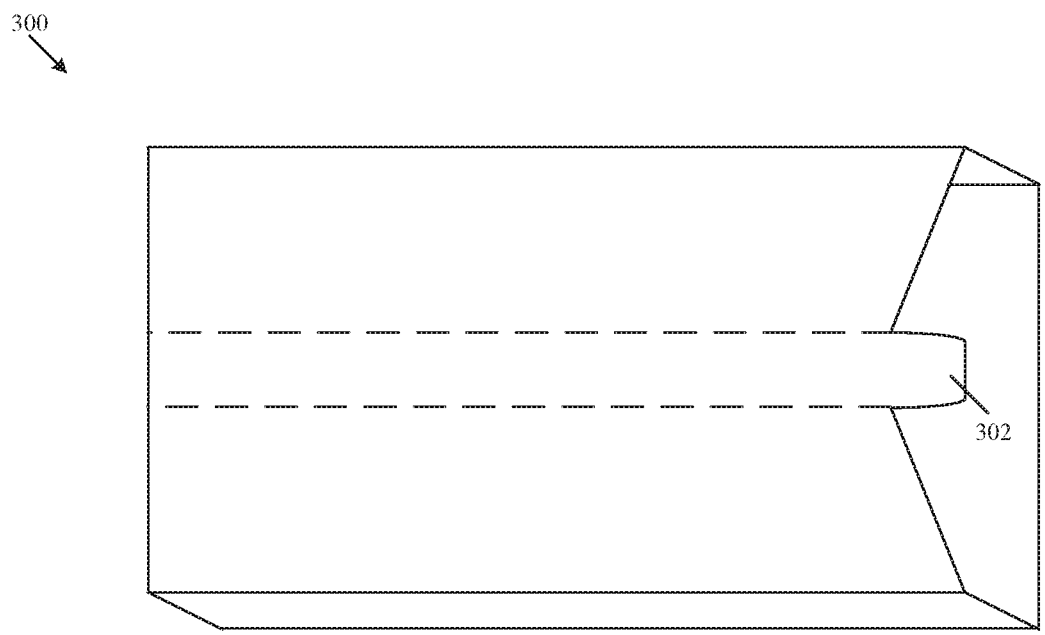
FIG. 6 is an example embodiment of a container for the display shown in FIG. 1.

Referring now to FIG. 6, the display 101 may be assembled and packed into a container 300 for transport or storage. The container 300 is configured to at least partially cover the display 101 and keep the display 101 in the first, collapsed configuration. In some arrangements, the container 300 is configured to completely enclose the display 101 within. In other arrangements, the container 300 includes a member that wraps around the tray 100 and the stand 200 while in the first, collapsed orientation. In yet other arrangements, the container 300 is an overwrap (e.g., cellophane) around the display 101. The container 300 may also include a tear strip 302 to facilitate opening, which may be configured as a strip along a surface of the container 300 defined by at least two lines of weakening.

Figure 7:
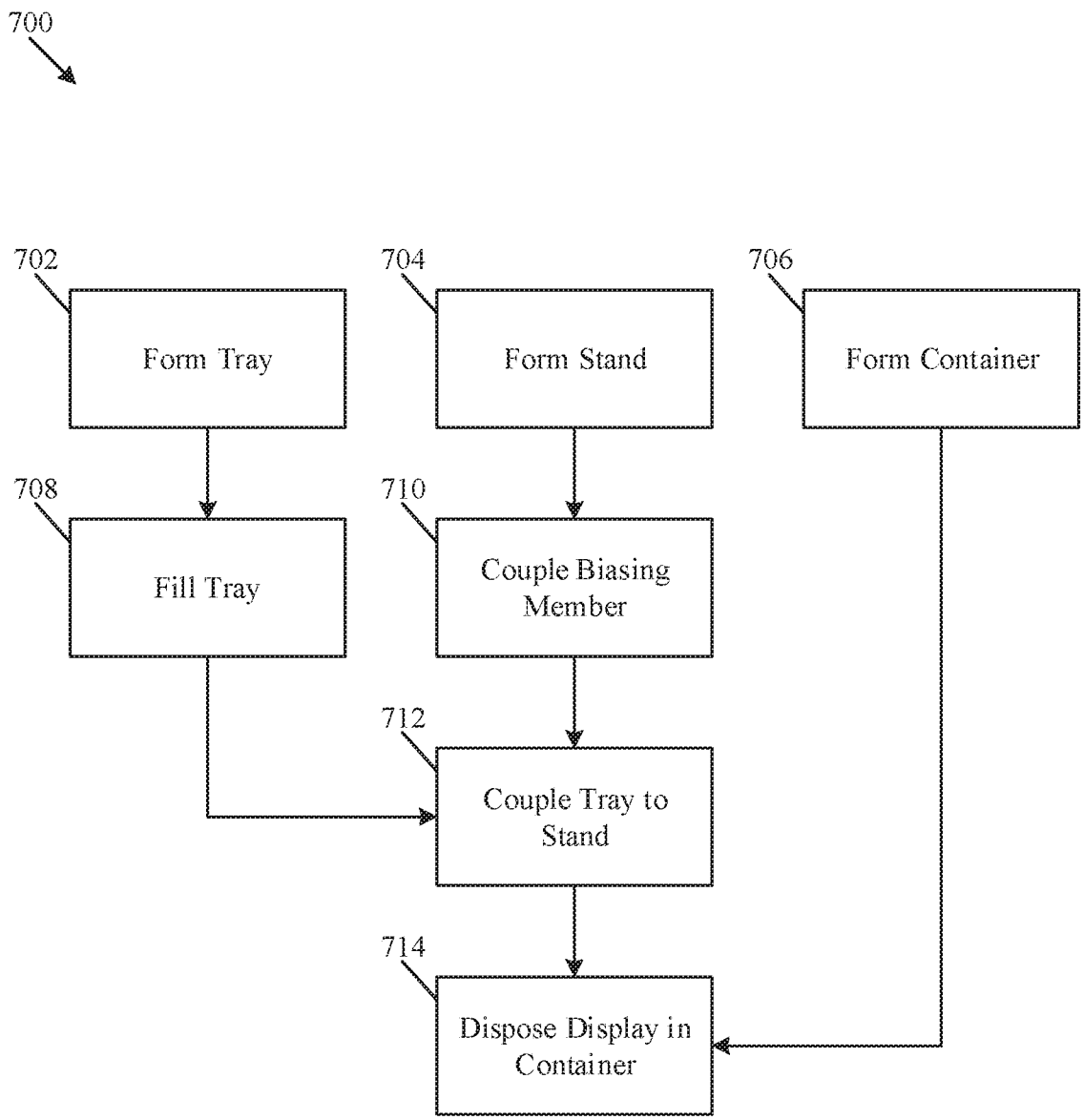
FIG. 7 is a flow diagram of a method of assembling a display, according to an example embodiment.

Referring to FIG. 7, a method 700 of providing a display is described. A tray (e.g., the tray 100), at least one stand (e.g., the stand 200), and a container (e.g., the container 300) is formed at 702, 704, and 706 respectively. The tray, stand, and container may be assembled from respective blanks of paperboard, plastic, metal, and so on.

At 708, the tray is filled with consumer products (e.g., consumer products 400). A biasing member (e.g., the biasing member 203) is coupled to the stand at 710, and the tray is coupled to the stand (e.g., with the tab 106 of the tray 100) to assemble the display at 712. In some arrangements, more than one stand is coupled to the tray at 712.

At 714, the display is disposed within the container. The display may then be provided to a retailer. The retailer may open the container, for example by removing a tear strip (e.g., the tear strip 302), and remove the display. Upon removing the display, the biasing member will cause the stand to erect toward the second configuration until an interior wall of the stand (e.g., the interior wall 202) engages an interior face of a stand edge (e.g., the interior face of the side back edge 210). The retailer may then place the display on a shelf to allow customers to access to consumer products.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A display comprising:
a tray configured to house a plurality of consumer products;
a stand coupled to the tray, the stand comprising a first wall and a second wall defined by a first edge, a third wall and a fourth wall defined by a second edge opposite the first edge, and an interior wall coupled to the second edge and disengaging the first edge in a first configuration in which the stand is collapsed and engaging the first edge in a second configuration in which the stand is erect; and
a biasing member coupled to the stand and biasing the first edge and second edge towards each other to move the stand from the first configuration to the second configuration.

2. The display of claim 1, wherein the tray further includes a tab configured to removably engage the stand.

3. The display of claim 1, wherein an adhesive couples the tray to the stand.

4. The display of claim 1, wherein more than one stand is coupled to the tray.

5. The display of claim 1, wherein the stand is formed from a single blank.

6. The display of claim 1, wherein at least one of the stand and the tray defines a display angle of the tray relative to a surface upon which the stand sits.

7. The display of claim 6, wherein the display angle is defined by each of the stand and the tray.

8. The display of claim 1, wherein at least one notch in the stand retains the biasing member to the stand.

9. The display of claim 1, further comprising a container disposed about the tray and stand, wherein the container retains the stand in the first configuration.

10. The display of claim 9, wherein the container comprises a tear strip.

11. A method of assembling a display comprising:
providing a tray configured to house a plurality of consumer products;
providing a stand comprising a first wall and a second wall defined by a first edge, a third wall and a fourth wall defined by a second edge opposite the first edge, and an interior wall coupled to the second edge and disengaging the first edge in a first configuration in which the stand is collapsed and engaging the first edge in a second configuration in which the stand is erect;
coupling a biasing member to the stand, the biasing member biasing the first edge and second edge towards each other to move the stand from the first configuration to the second configuration; and
coupling the tray to the stand.

12. The method of claim 11, further comprising forming a tab in the tray configured to removably engage the stand.

13. The method of claim 11, wherein the tray is coupled to the stand with an adhesive.

14. The method of claim 11, wherein more than one stand is coupled to the tray.

15. The method of claim 11, wherein the stand is formed from a single blank.

16. The method of claim 11, wherein at least one of the tray and the stand defines a display angle of the tray relative to a surface upon which the stand sits.

17. The method of claim 16, wherein the display angle is defined each of the tray and the stand.

18. The method of claim 11, wherein the stand is formed to include at least one notch to retain the biasing member to the stand.

19. The method of claim 11, further comprising disposing the tray and stand in a container that retains the stand in the first configuration.

20. The method of claim 19, wherein the container includes a tear strip.

* * * * *